United States Patent [19]

Dahlen et al.

[11] Patent Number: 4,478,855

[45] Date of Patent: Oct. 23, 1984

[54] PROTEIN CONTAINING FRUIT DRINK AND PROCESS FOR THE MANUFACTURE THEREOF

[75] Inventors: Anne-Marie Dahlen; Olof B. S. Strinning, both of Stockholm, Sweden

[73] Assignee: Arla, Ekonomisk Forening, Stockholm, Sweden

[21] Appl. No.: 463,546

[22] Filed: Feb. 4, 1983

Related U.S. Application Data

[63] Continuation-in-part of Ser. No. 334,522, Dec. 28, 1981, abandoned.

[51] Int. Cl.$^3$ .................. A23C 9/12; A23C 9/146; A23C 21/02; A23C 21/08; A23L 2/26
[52] U.S. Cl. .................................. 426/41; 426/42; 426/271; 426/330.5; 426/583; 426/584; 426/599
[58] Field of Search ............... 426/271, 330.3, 330.5, 426/583, 584, 590, 599, 650, 654, 324, 41, 42, 657, 651

[56] References Cited

U.S. PATENT DOCUMENTS

| | | | |
|---|---|---|---|
| 2,681,858 | 6/1954 | Stimpson | 426/583 X |
| 3,692,532 | 9/1972 | Shenkenberg et al. | 426/599 X |
| 3,852,496 | 12/1974 | Weetall et al. | 426/42 X |
| 3,862,342 | 1/1975 | Maraulja et al. | 426/599 |
| 3,896,241 | 7/1975 | Macaspina et al. | 426/590 X |
| 3,949,098 | 4/1976 | Bangert | 426/590 X |
| 4,200,662 | 4/1980 | Sibelli | 426/590 X |
| 4,212,893 | 7/1980 | Takahata | 426/590 X |
| 4,309,417 | 1/1982 | Staples | 426/590 X |
| 4,358,464 | 11/1982 | Soehnlen | 426/271 X |

OTHER PUBLICATIONS

Morris, "Sweet Protein Syrups", *Food Engineering*, 7-1980, pp. 35-36.

*Primary Examiner*—Arthur L. Corbin
*Attorney, Agent, or Firm*—Larson and Taylor

[57] ABSTRACT

A protein containing fruit juice drink comprising a fruit juice portion of 10–85% containing a citrus juice portion, a milk raw material portion of 90–15 percent by weight in which the milk raw material portion comprises whey proteins in an amount of 0.5–10 percent by weight of the finished product, and, as a sweetner, a hydrolyzed lactose, made of substantially pure lactose prepared from whey or a permeate from ultrafiltration of milk or whey, containing pure glucose and galactose derivate.

In the manufacture of the juice product of the aforementioned type a whey protein solution is prepared and the fruit juice is added while stirring the mixture. Hydrolyzed pure lactose is prepared by dissolving pure lactose crystals, obtained from whey or from a permeate of ultrafiltration of milk or whey, in pure water and hydrolyzing the lactose solution at a temperature of 60°–150°, whereupon the pure glucose-galactose product thereby obtained is admixed in the protein containing fruit-juice solution, whereupon the combined solution is pasteurized, homogenized, cooled and packed.

7 Claims, No Drawings

PROTEIN CONTAINING FRUIT DRINK AND PROCESS FOR THE MANUFACTURE THEREOF

This is a continuation-in-part of application Ser. No. 334,522 filed Dec. 28, 1981, now abandoned.

The present invention relates to a fruit juice drink comprising at least a citrus juice portion or a corresponding amount of citrus aromas in the amount of 10–85 percent by weight and a milk raw material portion in the amount of 90–15 percent by weight, and in which the milk raw material portion includes 0.5–10 or preferably 1–3 percent by weight of whey proteins. The invention also relates to a process for the manufacture of such drinks.

A problem in the manufacture of protein containing fruit drinks is that the protein tends to precipitate from the drink unless special measures are taken in the process or special additives are used for the drink.

During the past years numerous attempts have been made to combine fruit juices, especially citrus juices, with proteins, but many such attempts have failed. The problems are especially noticeable when sugar is added for sweetening of the product. In order to solve the problems involved in the protein precipitation many previous different methods have been suggested, especially methods according to which different substances have been added to the fruit drink for eliminating or at least reducing the precipitation of proteins.

Among previous methods, the U.S. Pat. No. 3,862,342 discloses a fruit drink containing citrus juice and whey proteins and in which different substances have been added for preventing the protein from precipitating. So, the said U.S. patent contains in addition to the citrus juice and the proteins some amount of glyco-proteins, starch, a sweetener in the form of corn syrup and a stabilizer, for instance a low viscosity sodium carboxymethylcelluose.

Correspondingly, the U.S. Pat. No. 3,949,098 discusses the problem with precipitation of proteins, and the patent relates to a process for the manufacture of a protein containing orange drink in which there is added, to an orange pulp base, a protein which is treated in a specific way, preferably a whey protein of a named type (Fore Tein 35 made by Foremost Foods Company of Foremost McKesson Inc.,). Further, a foam suppressor of a character which is not closely defined is added, and also sugar, citric acid and imitation flavourings are added. After the manufacture of the drink the product is intended to be frozen and to be kept frozen during storage.

The present invention relates to a fruit drink containing protein and a process for the manufacture thereof in which the problem with the protein precipitation has been solved in a way which is simpler and more economical for the process and in which there is no need for adding different types of stabilizing substances.

Therefore, the object of the invention is to provide a protein containing drink including fruit juice, especially a citrus juice and possible further fruit juices and in which the protein is carefully bound to the fruit drink so that it does not precipitate, even after several months of storing.

A further object of the invention is to provide a fruit drink which is preferably supplied ready for drinking and which, can be stored in that condition for at least several weeks, or which can be manufactured in concentrated form for dilution to any desired extent before being served.

A further object of the invention is to provide a fruit drink of the aforementioned type in which the protein is composed of whey proteins present in an amount of 0.5–10% of the prepared drink.

A further object of the invention is to provide a fruit drink of the aforementioned type which contains a sweetener, especially a sweetener in the form of lactose which by hydrolysis has been transformed to glucose and galactose.

The invention also relates to a process for the manufacture of a fruit drink of the above mentioned type.

Further advantages and characteristics of the invention will be evident from the following detailed description.

It is known that at least some proteins precipitate depending on the acidity of an acid fruit drink, and it is also known that the tendency of proteins increases following an increased content of sugar in the drink. Whey proteins have a lower tendency to precipitate, but also whey proteins precipitate to a greater extent when the content of sugar is increased in the drink. It has, however, been shown that the tendency of protein precipitation is reduced or is even completely eliminated if the sweetener in the drink is made from lactose which has been transformed to glucose and galactose. The reason for such reduced tendency of protein precipitation is not clear, but it may be suggested that a slight amount of oligo-saccharides are formed when lactose is transformed to glucose and galactose and that such oligo-saccharides seem to have an ability to bind proteins. It is also possible that galactose has some protein binding ability.

It has been suggested to hydrolyse a lactose containing permeate from cheese whey to obtain glucose and galactose which can be used as a sucrose or glucose substitute in many food applications. It also has been suggested to use such hydrolysed lactose containing whey permeate as a sweetener even for protein-fortified fruit drinks. So far it seems that the known product has not been used in practice. Tests with the product in fruit drinks containing at least a citrus juice have shown that the protein precipitates rather quickly, even if the fruit drink is stored in a cooled condition. Further, the fruit drink sweetened with the hydrolysed lactose containing whey permeate had a poorer taste, a whey taste, which was not considered acceptable for the product to be marketed on a commercial scale. The whey permeate contains both salts, which probably act as precipitators of the protein, and different substances which give the non-acceptable taste to the fruit drink when sweetened with the hydrolysed whey permeate.

Surprisingly it has now shown that a sweetener made of pure lactose which has been hydrolysed into glucose and galactose and which is thereby free from salts actually acts as a binder of the protein even in fruit drinks containing a citrus juice portion, and a fruit drink of the type can be stored for several months without risk of the protein precipitating. Further, the glucose and galactose derived from hydrolysed pure lactose is free from substances giving an unwanted taste to the fruit drink. According to the invention it is therefore important that the hydrolysed lactose be made from pure lactose crystals which are dissolved in pure water and that the solution be hydrolyzed so as not to introduce salt or substances giving the unwanted taste to the ready fruit drink.

According to the invention the sweetener of the fruit drink is therefore made for a hydrolysed pure lactose, in which at least the main portion of the lactose is transformed to glucose and galactose, and the fruit drink thereby obtains such a protein stabilizing property that the finished drink pasteurized and can be stored for a period of at least several weeks without any observation of protein precipitation.

In order to improve the stability of the protein, the ready made drink may be homogenised at a pressure of 30-250 bars or preferably 130-200 bars. The homogenising may be made before or after the drink is pasteurized.

The fruit drink according to the invention generally comprises a fruit juice portion and a milk raw material portion, in which the fruit juice portion contains 10-85% of the ready made drink, whereas the milk raw material portion contains 90-15% of the ready made drink. The fruit juice portion also may be strengthened by fruit aromas.

The fruit juice portion may consist of a citrus juice or preferably contain a citrus juice portion and/or one or more further fruit juice parts. A mixture of different fruit juices can give a pleasant taste and, examples of such mixtures are: orange-pineapple, orange-lemon-grapefruit, orange-pineapple-passion fruit, mango-lemon, lemon-grapefruit, mango-passion fruit-orange, orange-mango-apricot, lemon-pineapple-passion fruit, lemon-blueberries-apple, lemon-lingonberries-cranberries, lemon-elderberries-wild strawberries, pure lemon, etc.

Depending on which taste, acidity, concentration degree, etc. is wanted the juice portion of the finished product may vary between 10 and 85%, but where such acid juices as orange, lemon, grapefruit, pineapple, passion fruit, etc. are used, the fruit juice portion preferably should be 40-60% of the finished product.

The milk raw material portion, which is included in an amount of 90-15%, or in the above mentioned acid fruit juice example preferably in the amount of 60-40%, contains whey proteins in an amount of 0.5-10% or preferably 1-3% of the product ready for drinking. The whey proteins may be provided as a whey protein powder which is dissolved in water, or from whey or as a liquid whey protein concentrate, and allowed to swell for at least four hours.

The milk raw material portion can also be considered to include the sweetener, which according to the invention is a hydrolyzed lactose which may be manufactured according to a special process, and which is added in an amount of 2.5-20% or preferably 6-10% of the finished product. The sweetener also may be obtained from whey or a whey concentrate the lactose portion of which has been hydrolysed to glucose and galactose.

The hydrolysed lactose can be manufactured, for instance, by heating to 60°-150° C., preferably 90°-120° C. lactose made from whey or a permeate from ultra filtration of milk or whey and having a dry matter content of between 30 and 90%, or preferably between 40 and 80%, in water whereupon the lactose solution is hydrolysed by means of an acid cation exchanger, or by means of a suitable enzyme wherein the hydrolysis proceeds to a hydrolysing degree of between 40 and 100% or preferably between 70 and 90%. At a hydrolysing degree of more than 80% there is practically no precipitation of crystals in the obtained glucose-galactose solution.

The manufacture of the fruit drink according to the invention is made as follows:

A solution of a whey protein material is made, and to the whey protein solution is added one or more fruit juices while stirring the solution, at least one fruit juice of which preferably is a citrus juice.

Simultaneously therewith a lactose solution is transformed by hydrolysis to a solution of glucose and galactose having a dry matter content of 30-90% or preferably 40-80% and having a hydrolysing degree of 40-100% or preferably 70-90%, and the glucose-galactose solution thereby obtained is added under stirring to the protein juice solution at substantially the same temperature as the said protein juice solution. When the ingredients are well mixed and dissolved the juice drink is pasteurized by being heated to about 70°-90° C. which temperature is maintained for about 30-5 seconds respectively. The pasteurizing may also be made at higher temperatures for correspondingly shorter periods of time or at lower temperatures for correspondingly longer periods of times which give the corresponding lethal effect. Just before or after the pasteurizing step the product is homogenised at 30-250 bar or preferably 130-200 bar, and the fruit drink is thereafter cooled to less than 30° C. and packed. The finished and packed product may, after aseptic packing, be stored at room temperature or otherwise preferably at refrigerator temperatures of $+4°-+8°$ C. for several weeks without any precipitation of proteins.

Alternatively the fruit drink can be manufactured in concentrated form from a protein concentrate, concentrated fruit juice and/or fruit aromas and a concentrated hydrolysed lactose. Such a concentrated fruit drink is not diluted until the drink is to be served. The concentration preferably is such that the concentrated fruit drink is diluted with up to five parts of water to obtain a fruit drink ready for drinking.

As mentioned above the risk of precipitation of proteins increases, following an increased content of proteins, especially at long storage times, and likewise the risk of protein precipitation increases if there is a low content of hydrolysed lactose. In such cases the high content of proteins and/or the low content of hydrolysed lactose may be compensated for in that the fruit drink is given a slight amount of a stabilizer of a type containing polysaccharides having some portion of galactose derivate or galacturonic acid, for instance pectin, carrageenan, arabino-galactane, agar-agar or a similar substance. Normally no such addition of stabilizer is needed, but at high contents of proteins and low contents of hydrolysed lactose a stabilizer of the above mentioned type may be added in an amount of 0.05-0.2 percent by weight of the finished product.

The finished product has a semi-transparent or opaque appearance and a smooth consistency without any precipitated portions of proteins or lactose. Depending on which raw materials have been added to the product the final product has a pH-value of 2.5-4.5 or preferably between 3.6 and 4.0. Naturally the pH-value may be adjusted up or down according to requirements before the product is pasteurized.

Following are a number of examples of the process for the manufacture of the fruit drink according to the invention are herein.

EXAMPLE 1

A whey protein powder having 43% content of protein was dissolved in an amount of 2.3 kg (corresponding to the finished product) in 66.2 kg water at room temperature (+20° C.) and the solution was allowed to stand swelling for 8 hours. While stirring, three different fruit juice concentrates were added, viz. 3.0 kg orange concentrate having a refractometer value of 63°, 7.0 kg pineapple concentrate having a refractometer value of 45° and 1.5 kg passion fruit concentrate having a refractometer value of 30.0°. While stirring, to the solution was thereafter added 20.0 kg of a hydrolysed lactose made of whey and comprising glucose and galactose and having a dry matter content of 42%. After some minutes of stirring the solution proved to be smooth and well mixed and the solution was pasteurized at 71° C. for 30 seconds. Immediately after pasteurizing the product was cooled to 10°–12° C. and was packed.

From the process was obtained 100 kg of a good tasting and fully flavoured fruit drink having a smooth and pleasant consistency and an opaque yellow white appearance. The product had a microbiological keepability of several months, and after five weeks of storing at a temperature of +8° C. there was no tendency of precipitation of proteins. The fruit juice portion of the final product corresponded to about 45%, the product had a protein content of 1.0% and a content of hydrolysed lactose of about 8.4% (as calculated according to the above mentioned dry matter content of 42%).

EXAMPLE 2

4.5 kg of a whey protein concentrate having a dry matter content of 30% and a protein content of 18.0% was dissolved in 43.5 kg water of room temperature. To the whey protein solution was added 10.0 kg lemon juice ready for drinking, 12.0 grapefruit juice ready for drinking and 30.0 kg of a hydrolysed lactose mainly comprising glucose and galactose and having a dry matter content of 60%.

After some minutes of stirring the mixture was smoothed and well mixed. Thereupon the mixture was pasteurized at 75° C. for a period of 15 seconds. The pasteurized product was homogenised at 100 bars and was immediately cooled to +4° C.

The product had a protein content of 0.81%. The fruit juice portion of the product was 22% and the portion of hydrolysed lactose was 18%. The drink had a fresh taste and was found refreshing. After five weeks of storing at +4° C. there was no precipitation of protein.

EXAMPLE 3

Whereas the products in examples 1 and 2 were made as drinks ready for drinking the product of the present example is concentrated for dilution when served.

For this purpose a whey protein concentrate having a dry matter content of 25% was mixed in an amount of 32.6 kg with 22.4 kg pineapple concentrate having a refractometer value of 40% and 12.8 kg orange concentrate having a refractometer value of 50%, and the mixture was stirred for some minutes. To the mixture was thereafter added 32.2 kg of a hydrolysed lactose mainly comprising glucose and galactose and having a dry matter content of 60%.

After some minutes of stirring the product was pasteurized at 87° C. for six seconds, homogenised at 200 bars and cooled to +8° C.

The concentrated drink thereby obtained had a protein content of 4.9% and a content of hydrolysed lactose of 13%. The fruit juice portion of the concentrated drink was 35.2%.

Before serving the drink it is preferably diluted with 4–5 parts of water and is stirred to a product ready for drinking. The drink had a mildly soft sour taste and a very mellow and pleasant texture.

The concentrated product had a very good shelf life, and after storing for ten weeks at +8° C. the product showed no tendency to precipitate proteins. With the same good result and without losing its mild sour and agreeable taste the product could also be frozen for later use in melted and diluted form.

EXAMPLE 4

A protein containing fruit drink ready for drinking was produced by dissolving 12.2 kg of a whey protein powder having a protein content of 75% in 12.62 kg water and adding 40 kg grapefruit juice ready for drinking and 10.0 mango juice to the solution. After slight stirring 25 kg of a hydrolysed lactose having a dry matter content of 45% and 0.18 kg apple pectin was added. After some minutes of stirring the product was smoothed and it was homogenised at 40 bars and thereafter pasteurised at 90° C. for five seconds, whereupon the product was cooled to +8° C. and packed. The protein content of the finished product was 9.2%, the fruit juice portion 50.0% and the portion of hydrolysed lactose 11.2% (as calculated from the above mentioned dry matter content of 45%).

The drink was viscous and had a very mellow and pleasant sweet taste. To a great extent the mellowness depends on the high content or proteins. Depending on the high protein content it might be expected that there is a risk for stratification and precipitation of proteins, and therefore a stabilizer in the form of apple pectin was added—however in a small amount of 0.18% as calculated on the finished product, and no stratification or protein precipitation could be noticed after storing at +8° C. for five weeks.

EXAMPLE 5

100 kg protein containing fruit drink according to the invention, ready for drinking, was made by mixing 4.8 kg whey protein powder, provided by ultra filtration of whey and having a protein content of 62%, with 29.2 kg water of about 20° C. The protein powder and the water was stirred for some minutes. The solution was allowed to stand swelling for 4 hours whereupon 10.0 kg blueberry juice ready for drinking, 14.0 kg lemon juice ready for drinking and 20.0 kg apple juice was added while stirring the solution. Further, there was added 22.0 kg of a hydrolysed lactose having a dry matter content of 58% and a stabilizer in the form of carrageenan in an amount of 0.06 kg.

The mixture was pasteurized at 82° C. for 7 seconds, it was homogenised at 230 bars, was cooled to +15° C. and packed under aseptic conditions. The fruit juice portion of the finished drink was 44% and the portion of hydrolysed lactose was 12.8% (as calculated on the above mentioned dry matter content). The protein content of the drink was 3.0%. The drink had a strong sour taste of a character which was hard to define and it had a good sweetness.

Depending on the relatively high content of protein and the very little amount of added stabilizer, protein precipitation on storing of the product was expected. After six weeks of storing of the product at +10° C. no protein precipitation could be noted, but after 12 weeks of storing a tendency to protein precipitation could be observed.

EXAMPLE 6

2.0 kg of a whey protein powder having a protein content of 58% was mixed with 22.0 kg of a hydrolysed lactose having a dry matter content of 55%, 11.0 kg pineapple juice, 0.1 kg passion fruit aroma, 0.1 kg pineapple aroma and 64.8 kg water. The mixture was stirred for about 10 minutes at 20° C., whereby a smooth and lump free solution had been obtained. The solution was allowed to stand without stirring for two hours, whereupon it was quickly stirred, pasteurized at 85° C. for 15 seconds and homogenised at 150 bars. The drink was thereafter cooled to +10° C. and was packed.

The finished drink had a protein content of 1.2%, a fruit juice portion of 11.0% and a portion of hydrolysed lactose of 12.1% (as calculated with respect to the above mentioned dry matter content).

The drink had a relatively strong sour taste and a slight half-mellow consistency. When storing the product for six weeks at +8° C. the product showed no tendency to stratification or protein precipitation.

A further large number of products having different contents of proteins and hydrolysed lactose and different types and amounts of fruit juice have been tested. It has been shown that the mixing temperature and the mixing time for the protein concentrate and water has little effect on the product and on possible stratification and protein precipitation of the product, whereas, on the contrary, the content of proteins in the finished product and the amount of hydrolysed lactose has a large effect on such possible stratification and protein precipitation. Comparative tests using ordinary sugar rather than hydrolysed lactose failed completely in that in all tests stratification and protein precipitation appeared already after a short time of storing. In some cases the proteins precipitated already during the pasteurizing step.

In the following an additional number of examples are given in a form of a table. In all cases protein concentrate, fruit juice and hydrolysed lactose were mixed as stated in the above examples, and in all cases the ready mixture was pasteurized and homogenised at the same temperature time-conditions as in the above examples. In all of the following examples the protein portion was obtained from a whey protein powder having a protein content as stated in the table, and the sweetener matter was a hydrolysed lactose having the dry matter content as stated in the table and mainly comprising glucose and galactose.

TABLE

| Example | Juice portion type | % | Hydrolysed lactose DM-content | % | Protein content % | Water % |
|---|---|---|---|---|---|---|
| 7 | mango | 5.3 | | | | |
|   | lemon | 14.0 | 53 | 26.4 | 2.0 | 51.7 |
| 8 | lemon | 25.0 | 53 | 14.3 | 1.0 | 59.2 |
| 9 | apple | 12.0 | | | | |
|   | lingonberry | 5.0 | | | | |
|   | lemon | 4.0 | | | | |
|   | grape | 40.0 | 45 | 6.2 | 3.3 | 28.6 |
| 10 | orange | 20.0 | | | | |
|   | apricot | 10.0 | | | | |
|   | passionfruit | 1.0 | 70 | 9.0 | 2.5 | 57.0 |

(DM-content stands for dry matter content)

It is to be understood that the above specification and the examples give therein are only illustrative and that all kinds of modifications may be presented within the scope of the appended claims as evident to the expert.

We claim:

1. A homogenized and pasteurized protein containing fruit juice drink comprising a citrus juice portion or a corresponding amount of citrus aromas in an amount of 10-85% and a milk raw material portion in an amount of 90-15 percent by weight, in which the milk raw material portion includes 0.5-10 percent by weight of whey proteins, said fruit juice drink containing, as a sweetener, 2.5-20 percent by weight of hydrolysed lactose consisting essentially of a salt- and taste-free pure glucose—galactose derivative prepared by dissolving pure lactose crystals, obtained from whey or a permeate from ultrafiltration of milk or whey, in pure water and hydrolysing the lactose solution by means of a cation exchanger, said fruit juice drink further containing 0.05 to 0.2% of a polysaccharide stabilizer comprising galactose derivate or galacturonic acid.

2. A fruit juice drink according to claim 1, wherein the citrus juice portion is a citrus juice concentrate and is strengthened with one or more natural or synthetic aromas.

3. A fruit juice drink according to claim 1, wherein the citrus juice portion comprises orange juice, pineapple juice and passion fruit juice.

4. A process for the manufacture of a homogenized and pasteurized protein containing fruit juice drink according to any of the preceding claims and comprising a citrus juice portion or a corresponding amount of citrus aromas in an amount of 10-85% percent by weight and a milk raw material portion in an amount of 90-15 percent by weight, comprising the steps of preparing a protein solution having a whey protein content of 0.5-10 percent by weight, as calculated on the product ready for drinking, mixing one or several fruit bases including at least a citrus juice portion or a corresponding amount of citrus aromas into the protein solution, making a lactose solution consisting essentially of glucose-galactose derivate by dissolving pure lactose crystals, obtained from whey or a permeate from ultra filtration of milk or whey, in pure water and hydrolysing the lactose solution, mixing the hydrolysed lactose solution, in an amount of 2.5-20 percent by weight, into the protein-fruit solution, adding 0.05 to 0.2% by weight of a polysaccharide stabilizer comprising galactose derivative or galacturonic acid, stirring the resultant solution, pasteurizing the stirred solution, and homogenizing the stirred solution at a pressure of 30-250 bars before or after said pasteurizing, and then cooling and packing the stirred, homogenized and pasteurized solution to obtain a protein containing fruit juice drink.

5. A process according to claim 4, wherein the protein solution is made of a whey protein powder which is dissolved in water and is allowed to swell for at least 4 hours before the fruit base and the hydrolysed lactose solution are added.

6. A process according to claim 4, wherein the hydrolysed lactose solution is prepared by dissolving the lactose crystals in said water at a temperature of 60°-150° C., whereupon the lactose-water solution thereby obtained is hydrolysed by means of an acid cation exchanger or by means of a suitable enzyme, whereby the hydrolysis proceeds to a hydrolysing degree of 40-100%, whereupon a salt and taste-free glucose-galactose product having a dry matter content of 30-90% is obtained and is then cooled to a temperature of less than 30° C.

7. A process according to claim 4, wherein the fruit juice drink is prepared in concentrated form from concentrated proteins, concentrated fruit juices and/or aromas and concentrated hydrolysed lactose, and in which the drink is pasteurized, homogenized and packed in concentrated form to be diluted to a fruit drink ready for drinking.

* * * * *